United States Patent [19]

Bernard et al.

[11] 4,047,436
[45] Sept. 13, 1977

[54] MEASURING DETECTOR AND A METHOD OF FABRICATION OF SAID DETECTOR

[75] Inventors: Jean Bernard, St-Martin D'Heres; Giorgio Frossati, Grenoble Gare; Georges Guernet, Grenoble; Michel Montier, Meylan; Louise Peccoud nee Toupillier, Claix; Daniel Thoulouze, Echirolles, all of France

[73] Assignee: Commissariat a l'Energie Atomique, Paris, France

[21] Appl. No.: 220,747

[22] Filed: Jan. 26, 1972

[30] Foreign Application Priority Data

Jan. 28, 1971 France .................................. 71.02774

[51] Int. Cl.$^2$ ................................................ G01K 7/00
[52] U.S. Cl. ................................ 73/362 SC; 29/576 B; 29/573; 338/25
[58] Field of Search ............ 29/571, 578, 573, 576 B, 29/577; 317/235; 357/81; 73/362 SC

[56] References Cited

U.S. PATENT DOCUMENTS

| | | | |
|---|---|---|---|
| 3,141,135 | 7/1964 | Amlinger | 29/577 |
| 3,411,199 | 11/1968 | Heiman | 29/571 |
| 3,413,531 | 11/1968 | Leith | 29/576 B |
| 3,479,234 | 11/1969 | Gray | 29/571 |
| 3,533,158 | 10/1970 | Bower | 29/571 |
| 3,655,457 | 4/1972 | Duffy | 29/576 B |
| 3,665,256 | 5/1972 | Goun | 357/81 |
| 3,747,203 | 7/1973 | Shannon | 317/235 |

Primary Examiner—W. Tupman
Attorney, Agent, or Firm—Lane, Aitken, Dunner & Ziems

[57] ABSTRACT

The measuring detector is constituted by the resistance of a given volume of doped semiconductor, there being formed on one face of a semiconducting monocrystal a surface region having a well-determined thickness and a well-determined concentration of doping ions and two electrical contacts at the extremities of said region.

The doped surface region is obtained by ion implantation and there is formed on the second face of the monocrystal a metallic coating which has good thermal conductivity and is in good thermal contact with said second face.

The detector is primarily applicable to thermometric measurements at very low temperatures below 1° K.

21 Claims, 3 Drawing Figures

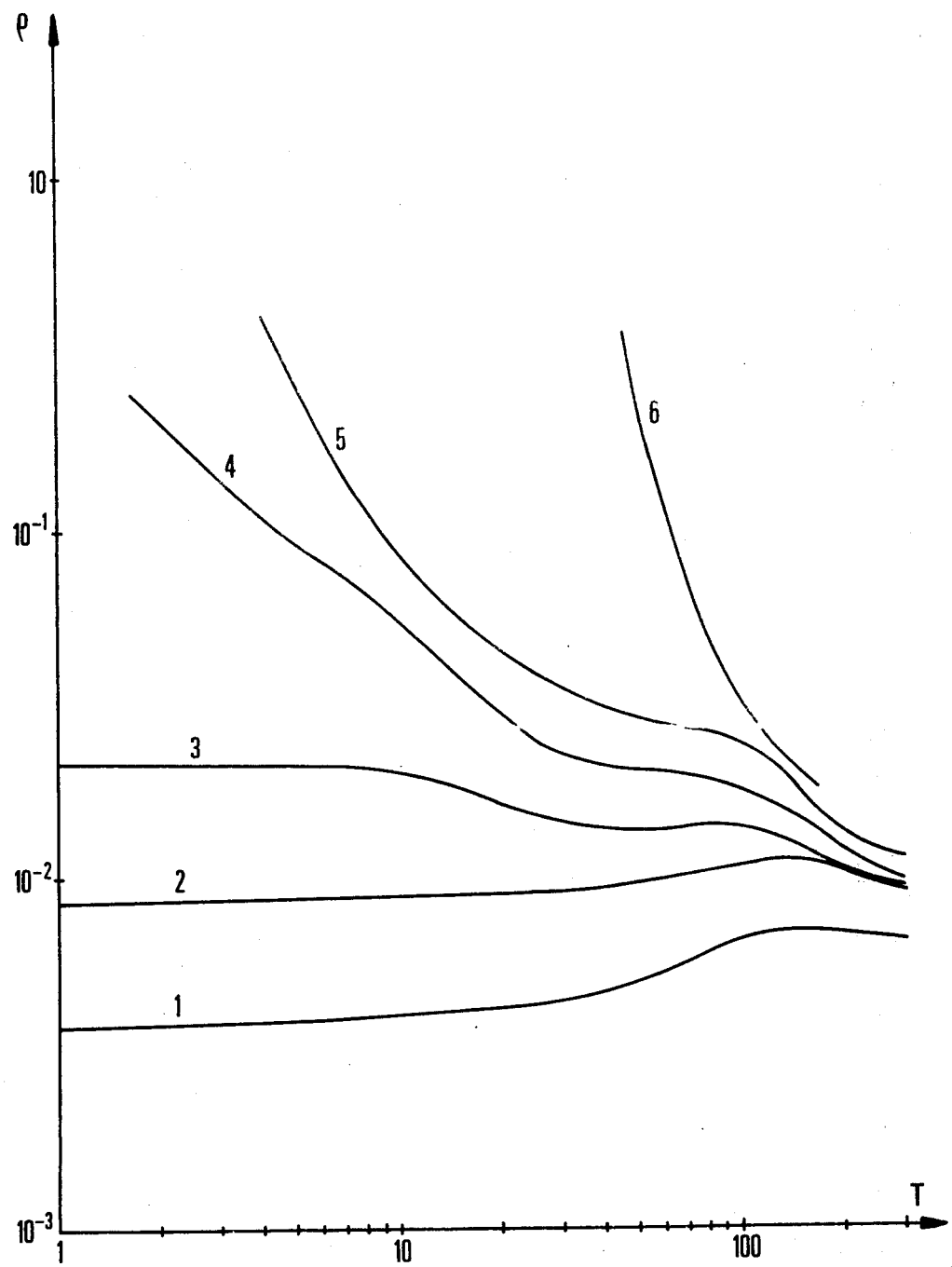
Fig: 1

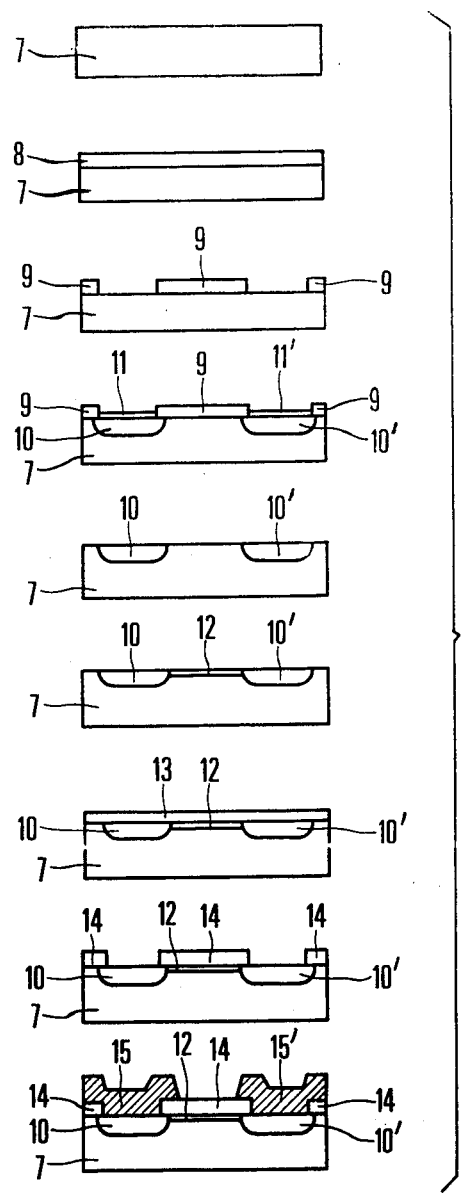
Fig: 2

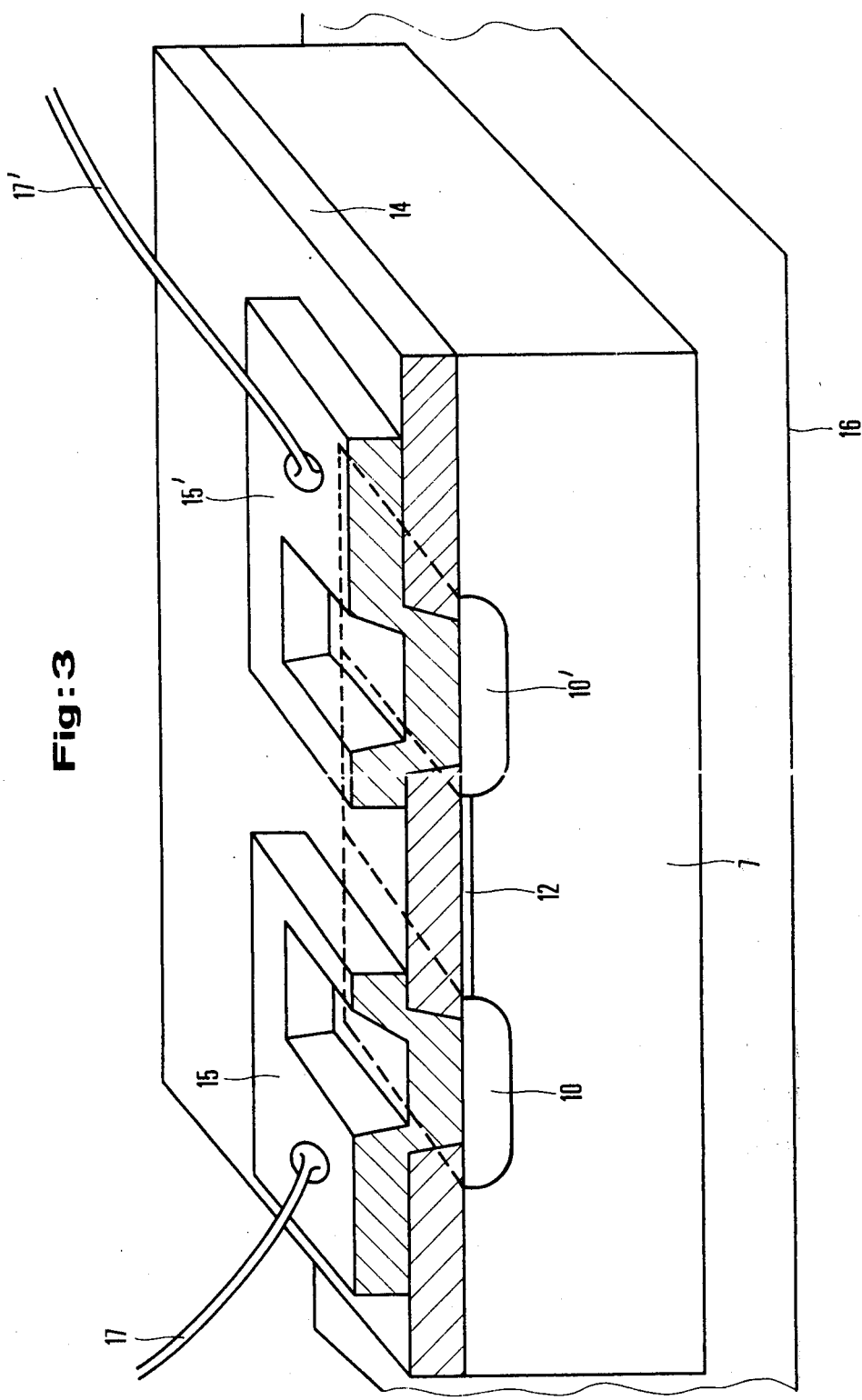

MEASURING DETECTOR AND A METHOD OF FABRICATION OF SAID DETECTOR

This invention relates to measurements at very low temperatures below 1° K and more precisely to the detectors which make it possible to carry out measurements under such conditions, and especially thermometric measurements.

The advances made in the past few years by the new techniques of refrigeration at very low temperatures (dilution of $He^3$ in $He^4$, Pomeranchuk effect, nuclear demagnetization) indicate the ever-increasing importance of this field in present-day research, particularly in solid-state physics. The systematization of measurements in this range of temperatures implies the need for accurate, sensitive and easy determination of the temperature which leads to a more and more precise knowledge of various parameters, heat transfer processes, various properties of materials employed, and for a fundamental study of the subject.

Starting from the temperature of the triple point of water which is determined as being 273.16° K, it is possible to obtain with very good accuracy primary scales of temperature which are equivalent to the thermodynamic scale:
- scale of the gas thermometer at constant volume from 300K to 4.2K;
- scale of the acoustic thermometer from 20K to 2K;
- scale of the saturated vapor pressure thermometer from 5.4K to 0.3K;
- electron paramagnetic scale from 1 Kelvin to 1 millikelvin (mK), or nuclear paramagnetic scale to 1 microkelvin ($\mu$K).

However, it is not always either possible or convenient to follow at each moment the progressive variation of temperature with a primary thermometer on account of its inertia or thermal capacity or of the spurious energy which it provides. Its sensitivity may also not be sufficient in the vicinity of a given temperature. For this reason, it is often preferable to calibrate carefully chosen secondary thermometers which are required to have:
- excellent reproducibility in order to avoid the need for calibration at the time of each experiment;
- small dimensions and yet good thermal contact in order to obtain a high speed of response. Thermal conductance of these contacts is substantially proportional to $T^3$ and they therefore have $10^6$ times lower thermal conductivity at 10mK than at 1K. It is then found necessary to employ extremely low measuring powers of the order of $10^{-15}$ watts which are frequently exceeded by the parasitic electric powers (powers induced in the circuits by the parasites which appear especially in the laboratory). There then takes place an internal heating of the thermometer which impairs the accuracy of the measurement;
- a possible adaptation to the problems under study:
  . either a very high sensitivity around a given temperature
  . or a reasonable resolution which is maintained over a wide range of temperature;
- the greatest possible insensitivity to parameters other than temperature: pressure, magnetic field, and the like.

The secondary thermometers which are most commonly employed have as measuring detectors the carbon and germanium resistors and the semiconducting diodes.

The thermal hysteresis of carbon resistors which is probably due to their agglomerated structure has resulted in preference being given to the use of germanium resistors, namely doped semiconducting monocrystals, between 1K and 100K. These latter are mounted commercially in a flexible manner within a metallic capsule with which a thermal contact is ensured by means of $He^3$ or $He^4$; they can also be attached to a germanium enclosure which is in contact with the body whose temperature is to be measured; in both cases, this thermal contact is insufficient at very low temperatures (lower than 0.1K) and their response time is not excellent. At the time of tests on silicon resistors having a small thickness which were employed in the construction of bolometers, it has been possible to attain very small time constants of the order of 100 $\mu$secs between 1K and 4K (R. Bachemann, H. C. Kirsch and T. H. Gebaur, R.S.I. 41, 547 — (1970).

The junction diodes which are at present manufactured offer good mechanical strength, good resolution and good stability from 1K to 300K, but the dissipated measurement power, of the order of $10^{-5}$ watts, is of much too high a value to contemplate the use of these diodes at very low temperatures.

At temperatures below 0.1K, only carbon resistors are employed. When used in the as-manufactured condition, these resistors lose all sensitivity below 50 mK. Use is also made of resistors which are cut into segments having a thickness of 0.3 mm (J. E. Robichaux, J. R. and A. C. Anderson, R.S.I. 40, 1512 — (1969) with an improved thermal contact which permit measurements to 10 mK without loss of sensitivity but with a very low proportion of success and a reproducibility of 1% in a measurement cycle with the same resistance.

This invention relates to a method of fabrication of detectors for taking measurements at very low temperatures below 1° K, to the measuring detectors obtained as a result of this method as well as to applications of these detectors; the invention makes it possible to produce measuring detectors which are not subject to the disadvantages of the known devices of the prior art which have just been mentioned.

To this end, the method according to the present invention, which permits the fabrication of measuring detectors of the type constituted by the resistance of a given volume of doped semiconductor, is essentially characterized, in that there are formed on one face of a semiconducting monocrystal a surface region having a well-determined thickness and a well-determined concentration of doping ions and two electrical contacts at the extremities of said region.

Preferably, said doped surface region is obtained by ion implantation and there is formed on the second face of said monocrystal a metallic coating having good heat conductivity, which is in good thermal contact with said second face.

Reference being made to the accompanying drawings, there will be described hereinafter one example which is not given in any sense by way of limitation and relates to the application of the method according to the invention for the fabrication of detectors which are intended for measurements at very low temperatures. The practical arrangements which will be described in connection with this example must be considered as forming part of the invention, it being understood that any equivalent arrangements could equally well be employed without thereby departing from the scope of this invention.

There are shown in the figures only those elements which are necessary to provide an understanding of the invention.

FIG. 1 illustrates the curves of variation in resistivity of doped n-type silicon as a function of temperature at different values of concentration of donor atom in excess per cubic centimeter.

FIG. 2 describes the end products which result from the successive technological stages of fabrication of a detector in accordance with the invention.

FIG. 3 gives a general diagram of the measuring detector as obtained in accordance with the invention.

The problem which has claimed the attention of the inventors lies in the construction of a thermometric detector which is capable of carrying out measurements at temperatures below the Kelvin scale (1° K) and is free from the above-mentioned drawbacks of carbon resistors which had exclusively been employed up to the present time. The inventors have considered it preferable to make use of resistors of doped semiconductor material, not in the form of monocrystals doped right through as was the case heretofore but in the form of surface layers of small thickness formed on one face of a single crystal which is itself of small thickness and in thermal contact on its other face with a sheet of metal having very good thermal conductivity. Since the thickness and resistivity of the surface layer must be known with accuracy and have highly reproducible values, its formation has entailed the use of ion implantation which makes it possible to obtain these results.

In fact, doping by ion implantation consists in introducing ions into the substrate while imparting thereto a very high energy compared with the thermal activation energies applied at the time of diffusion, typically about one hundred keV compared with a few eV. Thus, the penetration of impurities into the substrate is obtained independently of the crystal defects and the depth of penetration is much more uniform than in diffusion. Furthermore, the quantity of ions introduced is determined exactly by the measurement of the current intensity of the beam which falls on the sample. Finally, two implantation parameters, namely energy and dose, are independent.

In this manner, particularly advantageous flexibility of adjustment of the doping process is provided and control of these two parameters is very simple, which makes it possible to ensure both the requisite degree of precision and reproducibility of results.

Detectors of this type have shown much better reproducibility and it has been found that their use is much more convenient and systematic than carbon resistors. Silicon has proved to be preferable to germanium or to compound semiconductors since it is more stable, has a lower specific heat and is more insensitive to external parameters by virtue of its magnetoresistive properties.

The metal selected for ensuring a thermal contact with the second face of the semiconducting monocrystal is gold and the thermal contact has been carried out by eutectic bonding between silicon and gold.

In order to determine the characteristics of the semiconducting region, it has been necessary to study the conductive properties of doped n-type silicon as a function of the temperature.

The curves of FIG. 1 which have been plotted experimentally give the resistivity in $\Omega$cm of silicon doped homogeneously with donor atoms as a function of the temperature expressed in degree Kelvin in accordance with a logarithmic scale. The curves designated successively by the reference numerals 1, 2, 3, 4, 5 and 6 correspond to concentrations of excess donor atoms per cubic centimeter, respectively equal to $6.22 \times 10^{18}$, $4.12 \times 10^{18}$, $3.15 \times 10^{18}$, $2.69 \times 10^{18}$, $2.55 \times 10^{18}$ and $2.2 \times 10^{18}$.

It is observed that there exists a conduction zone of metallic type ($\rho$ varies only slightly with T) and a zone of exponential variation. The zone of transition, at the level of 2.5 to $3 \times 10^{18}$ donor atoms in excess per cubic centimeter of silicon, places the values of $\rho$ within a range which is experimentally interesting in order to have variations of resistance within a measurable temperature zone.

In the case of values of resistivity which are located in the transition zone, namely $10^{-2}$ $\Omega$cm and $10$ $\Omega$cm respectively, there are obtained in respect of layers having a thickness of 1 micron the respective squared resistance valves, of $100$ $\Omega$ and $10^5$ $\Omega$ which are readily measurable by means of adapted electronic instrumentation.

A small variation in doping with impurities changes the slope of the law $\rho$ (T) to a substantial degree. This consequently entails the need for control to within at least $\pm$ 5% of the quantities of impurities introduced into the silicon, which can readily be ensured by means of ion implantation.

There will now be described the technological construction of a detector according to the invention, reference being made to the drawings of FIG. 2 which show the zone corresponding to the formation of a single detector as represented in cross-section in a plane which coincides with its plane of symmetry.

The base material is a monocrystal 7 (single crystal) of n-type silicon doped with phosphorus impurities and oriented along the axis <111> having a concentration of excess donor atoms of $10^{17}$ atoms per cubic centimeter and a resistivity of 0.1 $\Omega$cm. This monocrystal is polished chemically on both faces until a thickness of 200 microns is obtained.

a. There is first formed a thermal surface oxidation of said monocrystal under moist oxygen, then under dry oxygen, during a period of time and at a temperature which are sufficient to obtain an oxide film having a thickness of 5000 A as designated by the reference 8.

b. There is then carried out a photoetching operation which is intended to reserve the sites of the electrical contacts: a so-called "positive" resin is applied, the areas located outside said sites are exposed to ultraviolet radiation and the exposed areas are uncovered by dissolving in buffered hydrofluoric acid; there remains a surface zone of silica as designated by the reference 9 in FIG. 2, pierced by two rectangular windows. The resin is removed by action of nitric acid.

c. Pre-deposition of phosphorus is carried out by means of phosphorus oxychloride $PoCl_3$ at 1050° C. Reoxidation is carried out at 1050° C in order to obtain in the windows which remain in zone 9, and in such manner as to extend slightly beneath the edges of these latter, two diffused zones having a depth of 3 microns, namely the zones 10 and 10' respectively, having a surface concentration of $10^{21}$ atoms per cubic centimeter and intended to serve as contacts at the terminals of the detector; two oxide layers of 1000 A, namely 11 and 11', remain on the diffused zones.

d. The oxides are washed with hydrofluoric acid and the zones 9, 11 and 11' are thus caused to disappear.

e. The resistant region 12 constituting the useful portion of the detector is formed by ion implantation of phosphorus atoms having an energy of 130 keV; the concentration of doping atoms per cubic centimeter is $3 \times 10^{18}$.

f. A deposit of silica having a thickness of 5000 A and having the reference 13 is formed over the entire surface of the monocrystal by pyrolysis of silane and oxygen at 380° C. When carried out at this temperature, this deposition does not impair the properties of the subjacent layers, especially of the resistant region 12.

g. A further photoetching operation is performed in order to free the site of the electrical contacts of the detector; this operation is wholly identical with that performed in section (b). A silica layer 14 which covers the resistant region 12 and the apparent areas of the original monocrystal 7 and projects slightly onto the diffused zones 10 and 10' is thus reserved. At the end of all these operations, the residual thickness of the monocrystal 7 has decreased to approximately 80 microns, thereby reducing the thermal resistance between the resistant region 12 and the second face of the monocrystal 7.

h. Aluminum is deposited uniformly to a thickness of 1 micron by vacuum evaporation. A photoetching operation similar to those performed in sections (b) and (g) is carried out by making use of phosphoric acid $PO_4H_3$ instead of buffered hydrofluoric acid in order to dissolve the aluminum: there are thus obtained two conductive pads 15 and 15' which cover the diffused zones 10 and 10'. In order to ensure an excellent electrical contact between the aluminum pads 15 and 15' and the diffused zones, an annealing operation is carried out over a period of 15 minutes at 500° C in a nitrogen atmosphere.

i. The foregoing operations were collective and made it possible to produce a matrix of detectors on a silicon wafer having large dimensions. Individual patterns are then cut-out in a lattice arrangement by means of a diamond. The remaining operations are described with reference to FIG. 3, in which an individual half-detector is illustrated in perspective and in cross-section along its plane of symmetry.

j. Each pattern is bonded by its underface to a gold foil 16 which is illustrated in FIG. 3: a gold-silicon eutectic is thus formed by placing the complete assembly at a temperature of 450° C which exceeds the eutectic temperature (370° C); wetting is assisted by preliminary vacuum deposition of gold on the underface of the crystal. Excellent thermal contact is thus obtained between the silicon crystal 7 and the gold foil 16.

k. Two gold wires 17 and 18 having a diameter of 25 to 50 microns are bonded to the aluminum pad 15 by thermocompression at 350° C; and two gold wires 17' and 18' are bonded in like manner to the pad 15'. The wires 18 and 18' (not shown) are symmetrical with the wires 17 and 17' with respect to the plane of symmetry of the detector.

l. The complete assembly is then coated with an epoxy resin (not shown) through which are passed-out the electrical contacts provided by the wires 17, 18, 17', 18' and the thermal contact with the foil 16.

It should be noted that the limitation of the resistant region 12 and of the contacts in the direction at right angles to the plane of FIG. 2 does not appear in this figure but is visible in FIG. 3.

The foregoing description has related to the fabrication of a detector for the measurement of temperatures. The invention also includes the applications of a detector with resistance of a doped surface region of a semiconducting substrate to the measurement of other values to which this resistance is sensitive, subject in particular to adaptation of its configuration and regulation of its temperature (such as, for example, the measurement of radiation energy or of magnetic fields).

What we claim is:

1. A method of fabricating a thermometric measuring detector for use at very low temperatures of the type constituted by the resistance of a given volumn of a doped semi-conductor, comprising: providing a semiconductor monocrystal having one type of conductivity, forming by ion implantation on a surface of a semiconductor monocrystal a surface region having a predetermined thickness having the same type conductivity as said monocrystal, and having a predetermined concentration of doping ions greater than the concentration of impurities in said monocrystal, forming electrical contacts at the extremities of said region, and forming a thermally conductive metallic coating on a face of said crystal opposite said surface region bonded to said crystal to be in thermal contact with said crystal.

2. A method of measuring temperature comprising fabricating a detector as recited in claim 1 and subjecting said metallic coating to the temperature to be measured.

3. A method according to claim 1, wherein said electrical contacts are obtained by the doping, by means of impurities of the same type as those of said doped surface region, of two surface zones located at the two extremities of said doped surface region.

4. A method according to claim 3, wherein said doping of the two surface zones is carried out by diffusion.

5. A method according to claim 3, wherein said electrical contacts are completed by a metallic deposit which covers said doped surface zones.

6. A method according to claim 1, wherein the junction between the second face of the semiconducting monocrystal and said metallic coating is formed by constituting a eutectic between the two substances.

7. A method according to claim 1, wherein said semiconducting monocrystal is of silicon.

8. A method according to claim 1, wherein doping of said surface region is of the $n$ type.

9. A method according to claim 8, wherein the doping impurity is phosphorus.

10. A method according to claim 3, wherein the doping of said surface zones is carried out with phosphorus.

11. A method according to claim 1, wherein said metallic coating is of gold.

12. A method according to claim 1, wherein the doping of said surface region is defined by concentrations of 2.5 to $3 \times 10^{18}$ donor atoms in excess per cubic centimeter.

13. A method according to claim 1, wherein the thickness of said surface region is of the order of 1 micron.

14. A method according to claim 1, wherein doping of said original semiconducting monocrystal is defined by a concentration of the order of $10^{17}$ donor atoms in excess per cubic centimeter.

15. A method according to claim 11, wherein said ion implantation of phosphorus into the silicon is carried out with ions having an energy of 130 keV.

16. A method according to claim 1, wherein the formation of said doped surface region and of said two electrical contacts entails the following operations, starting from a basic semiconducting monocrystal:

a. thermal oxidation of the first face of the semiconductor;
b. selective dissolving of the oxide obtained on the zones of the contacts;
c. selective diffusion of the doping atoms on said zones;
d. washing of oxides which have formed;
e. selective surface ion implantation of the region located between the contacts;
f. uniform deposition of an electrical insulator on said first face of the semiconductor;
g. selective dissolving of said electrical insulator outside a surface including said surface region and including on each side of said region a part of said zones diffused in section c);
h. surface metallization above said diffused zones which may cover on each side the edges of the remaining deposit of silica.

17. A method according to claim 16, wherein said electrical insulator is silica deposited at low temperature.

18. A method according to claim 5, wherein wires are welded to said metallic deposits which cover the doped surface zones.

19. A method according to claim 18, wherein said wires are of gold.

20. A method according to at least one of claim 1, wherein said detector is coated with a hardenable plastic material.

21. A thermometric detector as fabricated in accordance with the method defined in claim 1.

* * * * *